(12) United States Patent
Abe et al.

(10) Patent No.: US 11,215,299 B2
(45) Date of Patent: Jan. 4, 2022

(54) FERRITIC STAINLESS STEEL PIPE HAVING EXCELLENT SALT TOLERANCE IN GAP, PIPE-END-THICKENED STRUCTURE, WELDING JOINT, AND WELDED STRUCTURE

(71) Applicant: NIPPON STEEL Stainless Steel Corporation, Tokyo (JP)

(72) Inventors: Masatoshi Abe, Tokyo (JP); Junichi Hamada, Tokyo (JP); Nobuhiko Hiraide, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 140 days.

(21) Appl. No.: 16/492,527

(22) PCT Filed: Mar. 27, 2018

(86) PCT No.: PCT/JP2018/012598
§ 371 (c)(1),
(2) Date: Sep. 9, 2019

(87) PCT Pub. No.: WO2018/181401
PCT Pub. Date: Oct. 4, 2018

(65) Prior Publication Data
US 2021/0140569 A1 May 13, 2021

(30) Foreign Application Priority Data

Mar. 30, 2017 (JP) .............................. JP2017-069284

(51) Int. Cl.
C22C 38/00 (2006.01)
C22C 38/02 (2006.01)
(Continued)

(52) U.S. Cl.
CPC ........ F16L 13/0209 (2013.01); C21D 8/0205 (2013.01); C21D 8/0226 (2013.01);
(Continued)

(58) Field of Classification Search
CPC ....... C22C 38/008; C22C 38/02; C22C 38/04; C22C 38/06; C22C 38/50; C21D 2211/005
(Continued)

(56) References Cited

U.S. PATENT DOCUMENTS

2013/0074971 A1* 3/2013 Sakamoto ............... F16L 55/07
138/106
2014/0216614 A1* 8/2014 Hatano ................... C22C 38/44
148/602
2018/0031169 A1 2/2018 Urashima et al.

FOREIGN PATENT DOCUMENTS

CN 102947116 A 2/2013
CN 105874092 A 8/2016
(Continued)

OTHER PUBLICATIONS

Chinese Search Report and Office Action, dated Sep. 30, 2020, for corresponding Chinese Application No. 201880020584.5, with an English translation of the Chinese Search Report.
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

This ferritic stainless steel pipe contains, by mass %: C: 0.001% to 0.100%; Si: 0.01% to 2.00%; Mn: 0.01% to 2.00%; P: 0.001% to 0.05%; S: 0.0001% to 0.005%; Cr: 10.5% to 20.0%; Sn: 0.001% to 0.600%; Ti: 0.001% to 1.000%; Al: 0.001% to 0.100%; and N: 0.001% to 0.02%,
(Continued)

with a balance being Fe and unavoidable impurities, the ferritic stainless steel pipe includes a pipe-end-thickened portion at a pipe end portion, and a gap distance d (μm) formed at the pipe end portion satisfies a relationship of $d \geq Cr^2/(1000Sn)$ (in the expression, Cr and Sn represent amounts (mass %) of respective elements).

17 Claims, 3 Drawing Sheets

(51) Int. Cl.
    *C22C 38/04* (2006.01)
    *C22C 38/06* (2006.01)
    *C22C 38/50* (2006.01)
    *F16L 13/02* (2006.01)
    *C21D 8/02* (2006.01)
    *C21D 9/08* (2006.01)
    *C21D 9/46* (2006.01)
    *C22C 38/42* (2006.01)
    *C22C 38/44* (2006.01)
    *C22C 38/46* (2006.01)
    *C22C 38/48* (2006.01)
    *C22C 38/52* (2006.01)
    *C22C 38/54* (2006.01)
    *C22C 38/60* (2006.01)

(52) U.S. Cl.
CPC ......... *C21D 8/0236* (2013.01); *C21D 8/0263* (2013.01); *C21D 9/08* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *C21D 2211/005* (2013.01)

(58) Field of Classification Search
USPC ........................................................ 138/109
See application file for complete search history.

(56) References Cited

FOREIGN PATENT DOCUMENTS

| JP | 2004-255414 A | 9/2004 |
|---|---|---|
| JP | 2010-234406 A | 10/2010 |
| JP | 4727601 B2 | 7/2011 |
| JP | 2013-103250 A | 5/2013 |
| JP | 5297713 B2 | 9/2013 |
| JP | 5320034 B2 | 10/2013 |
| JP | 2014-169491 A | 9/2014 |
| JP | 5586279 B2 | 9/2014 |
| JP | 2015-206078 A | 11/2015 |
| JP | 2016-169417 A | 9/2016 |
| JP | 2016-169418 A | 9/2016 |
| JP | 6006660 B2 | 10/2016 |
| WO | WO 2016/129576 A1 | 8/2016 |

OTHER PUBLICATIONS

International Search Report for PCT/JP2018/012598 dated Jun. 26, 2018.
Written Opinion of the International Searching Authority for PCT/JP2018/012598 (PCT/ISA/237) dated Jun. 26, 2018.
Chinese Notice of Allowance and Search Report for counterpart Chinese Application No. 201880020584.5, dated Jan. 8, 2021, with English translation.
Jiang et al., "High temperature ductility and corrosion resistance property of novel tin-bearing economic 17Cr-xSn ferritic stainless steel," Ironmaking and Steelmaking, vol. 42, No. 7, 2015, pp. 504-511.
Zhang et al., "Corrosion properties of the 00Cr16Sn ultra pure ferritic stainless steel weld joint," Transactions of the China Welding Institution, vol. 36, No. 8, Aug. 2015, pp. 109-112.

\* cited by examiner

FERRITIC STAINLESS STEEL PIPE HAVING EXCELLENT SALT TOLERANCE IN GAP, PIPE-END-THICKENED STRUCTURE, WELDING JOINT, AND WELDED STRUCTURE

TECHNICAL FIELD

The present invention relates to a ferritic stainless steel pipe, a pipe-end-thickened structure, and a welded joint (welding joint), in which corrosion resistance is required for a crevice structure portion (gap structure portion).

The present application claims priority on Japanese Patent Application No. 2017-069284 filed on Mar. 30, 2017, the content of which is incorporated herein by reference.

BACKGROUND ART

Ferritic stainless steels are used in a wide range of fields such as household electronics, electronic devices, automobiles, and the like. Particularly in the automobile field, a stainless steel to be used is required to have heat resistance, corrosion resistance, and the like since it is used in various parts from exhaust manifolds to mufflers. In addition, since these parts are subjected to welding in most cases, strength, rigidity, and corrosion resistance of welded portions are also required.

In recent years, cases of examining thinning of materials used for each part have increased for the purpose of weight reduction of automobiles. However, a certain thickness is required in some cases in order to secure strength, rigidity, and weldability of welded portions, and a thickness may be thick even in non-welded portions. Therefore, thinning of the entire exhaust system is hindered. On the other hand, a technique is known in which, by increasing a thickness of a steel pipe end portion (an end portion of a steel pipe) that forms an exhaust pipe and is joined by being welded to other parts, welded portions are thickened to increase strength; and thereby, rigidity and weldability are secured. This is called pipe-end thickening (increasing a thickness of a pipe end portion of a steel pipe). In this case, non-welded portions can be made thinner. Thereby, the entire exhaust system can be made thinner and lighter.

Several techniques related to pipe-end thickening as described above have been disclosed. Patent Document 1 discloses a processing method in which a roller is pressed to an end portion while rotating a pipe to bend the end portion radially inward, and then the end portion is adhered by the roller for the purpose of securing strength of a pipe end portion and reducing a weight of the pipe. Patent Document 2 discloses a method of forming a pipe end in a double tubular shape and doubling a wall thickness to prevent burn-through at the time of welding. Patent Document 3 discloses a patent related to a raw pipe for folding a pipe end and increasing a thickness thereof, in which an inner bead portion of a welded portion protrudes to an inner surface of the pipe, and an amount of protrusion is defined as 4% to 15% of a sheet thickness.

The pipes disclosed in Patent Documents 1 to 3 in which a pipe end is thickened have a crevice structure (gap structure) with a height of several micrometers (μm) to several hundreds of micrometers (μm) at a bent portion. With regard to this crevice portion (gap, gap portion), in the case where the end portion is bent inward as in Patent Documents 1 and 2, exhaust gas condensate water generated in an interior of an exhaust system part tends to stay (remain) in the crevice portion. In the case where the end portion is bent outward as in Patent Document 3, salt water adhering from the outside of the exhaust system part tends to stay (remain) in the crevice portion.

Corrosion that occurs in this environment is not crevice corrosion but is salt damage corrosion that is promoted by the fact that salt water and exhaust gas condensate water tend to stay (remain) in the crevice environment (gap environment). As described above, since there is a possibility of promoting corrosion in a crevice portion, a steel type having excellent corrosion resistance against salt damage in a crevice portion (salt tolerance in a gap) is required as a stainless steel to be used. Particularly in exhaust system parts, perforation due to corrosion leads to leakage of exhaust gas. Therefore, it is important to apply a material having high resistance to perforation.

Patent Document 4 discloses a ferritic stainless steel which has excellent crevice corrosion resistance, and which contains: by mass %, C: 0.001% to 0.02%; N: 0.001% to 0.02%; Si: 0.01% to 0.5%; Mn: 0.05% to 1%; P: 0.04% or less; S: 0.01% or less; Cr: 12% to 25%; either one or both of Ti: 0.02% to 0.5% and Nb: 0.02% to 1%; and Sn: 0.005 to 2%, with a balance being Fe and unavoidable impurities. In the technique described in Patent Document 4, crevice corrosion resistance is improved by adding Sn, but there is no description regarding a relationship with a gap distance.

Patent Document 5 discloses an alloy-saving type ferritic stainless steel for automobile exhaust system members, which has excellent corrosion resistance after heating, and which contains: by mass %, C: ≤0.015%; Si: 0.10% to 0.50%; Mn: 0.05% to 0.50%; P≤0.050%; S: ≤0.0100%; N: ≤0.015%; Al: 0.020% to 0.100%; Cr: 10.5% to 13.05%; either one or both of Ti: 0.03% to 0.30% and Nb: 0.03% to 0.30%; and either one or both of Sn: 0.03% to 0.50% and Sb: 0.03% to 0.50%, with a balance being Fe and unavoidable impurities, in which a value of A defined by Equation (2) is 15.23 or greater.

$$A=[Cr]+[Si]+0.5[Mn]+10[Al]+15([Sn]+[Sb]) \quad \text{Equation (2)}$$

In the technique described in Patent Document 5, corrosion resistance after heating is improved by adding Sn and Sb, but there is no description regarding corrosion resistance when a (crevice) gap is present.

Patent Document 6 discloses a Mo-saving type ferritic stainless steel for automobile exhaust system members, which has excellent corrosion resistance after heating, and which contains: by mass %, C: ≤0.015%; Si: 0.01% to 0.50%; Mn: 0.01% to 0.50%; P≤0.050%; S: ≤0.010%; N: ≤0.015%; Al: 0.010% to 0.100%; Cr: 16.5% to 22.5%; either one or both of Ti: 0.03% to 0.30% and Nb: 0.03% to 0.30%; and Sn: 0.05% to 1.00%, with a balance being Fe and unavoidable impurities. In the technique described in Patent Document 6, corrosion resistance after heating is improved by adding Sn, but there is no description regarding corrosion resistance when a (crevice) gap is present.

Patent Document 7 discloses a ferritic stainless steel for automobile exhaust system members, which contains: by mass %, C: ≤0.015%; Si: 0.01% to 0.50%; Mn: 0.01% to 0.50%; P≤0.050%; S: ≤0.010%; N: ≤0.015%; Al: 0.010% to 0.100%; Cr: 16.5% to 22.5%; Ni: 0.5% to 2.0%; Sn: 0.01% to 0.50%; and either one or both of Ti: 0.03% to 0.30% and Nb: 0.03% to 0.30%, with a balance being Fe and unavoidable impurities. In the technique described in Patent Document 7, corrosion resistance of exhaust system parts after heating is disclosed, but there is no description regarding corrosion resistance in a crevice environment.

Patent Document 8 discloses a ferritic stainless steel for automobile exhaust system members, which has excellent oxidation resistance and corrosion resistance, and which contains: by mass %, C: 0.0150% or less; Si: 1.0% to 1.5%; Mn: 0.15% to 1.0%; P: 0.050% or less; S: 0.0100% or less; N: 0.0150% or less; Al: 0.010% to 0.200%; Cr: 13.0% to 16.0%; Sn: 0.002% to 0.050%; and either one or both of Ti: 0.03% to 0.30% and Nb: 0.03% to 0.50%, with a balance being Fe and unavoidable impurities, in which a value of A defined by Equation (1) is 0.024 or greater.

$$A=[Si]\times[Sn]+0.014[Si] \qquad (1)$$

[Si] and [Sn] respectively represent amounts of Si and Sn in terms of mass %.

In the technique described in Patent Document 8, corrosion resistance of exhaust system parts after heating is disclosed, but there is no description regarding corrosion resistance in a crevice environment.

Patent Document 9 discloses a ferritic stainless steel for exhaust system members, which has excellent corrosion resistance, and which contains: by mass %, C: 0.0150% or less; Si: 0.2% to 0.7%; Mn: 0.2% to 0.6%; P: 0.050% or less; S: 0.0100% or less; N: 0.0150% or less; Al: 0.010% to 0.20%; Cr: 10.5% to 11.5%; Mo: 0.02% to 0.20%; Sn: 0.005% to 0.050%; and either one or both of Ti: 0.03% to 0.30% and Nb: 0.03% to 0.50%, with a balance being Fe and unavoidable impurities, in which a value of A defined by Equation (1) is 0.00065%$^2$ or greater.

$$A=[Mo]\times[Sn] \qquad (1)$$

In the technique described in Patent Document 9, corrosion resistance of exhaust system parts after heating is disclosed, but there is no description regarding corrosion resistance in a crevice environment.

As described above, in the related art, no method has yet been proposed to improve corrosion resistance in a crevice environment formed at a pipe end portion of a pipe of which a pipe end is thickened.

PRIOR ART DOCUMENTS

Patent Documents

Patent Document 1: Japanese Unexamined Patent Application, First Publication No. 2010-234406
Patent Document 2: Japanese Unexamined Patent Application, First Publication No. 2013-103250
Patent Document 3: Japanese Unexamined Patent Application, First Publication No. 2004-255414
Patent Document 4: Japanese Patent No. 4727601
Patent Document 5: Japanese Patent No. 5297713
Patent Document 6: Japanese Patent No. 5320034
Patent Document 7: Japanese Patent No. 5586279
Patent Document 8: Japanese Patent No. 6006660
Patent Document 9: Japanese Unexamined Patent Application, First Publication No. 2014-169491

DISCLOSURE OF INVENTION

Problems to be Solved by the Invention

The present invention provides a solution to improve corrosion resistance in a crevice environment (gap environment) formed at a pipe end portion of a pipe of which a pipe end is thickened.

Solutions for Solving the Problems

In order to solve the above-mentioned problem, the inventors of the present invention conducted intensive studies on corrosion resistance in a crevice portion (gap, gap portion) of a ferritic stainless steel pipe. As a result, they found that, in a crevice environment, as an amount of Cr increases in a stainless steel, a pitting corrosion depth increases. Furthermore, they found that there is a relation between an amount of Cr, an amount of Sn, and a critical gap distance at which pitting corrosion grows deep.

The solutions for solving the above-mentioned problem have the following features.

[1] A ferritic stainless steel pipe having excellent corrosion resistance against salt damage in a crevice portion according to one aspect of the present invention, containing by mass %:
C: 0.001% to 0.100%;
Si: 0.01% to 2.00%;
Mn: 0.01% to 2.00%;
P: 0.001% to 0.05%;
S: 0.0001% to 0.005%;
Cr: 10.5% to 20.0%;
Sn: 0.001% to 0.600%;
Ti: 0.001% to 1.000%;
Al: 0.001% to 0.100%; and
N: 0.001% to 0.02%,
with a balance being Fe and unavoidable impurities,
the ferritic stainless steel pipe including: a pipe-end-thickened portion at a pipe end portion, in which a gap distance d (μm) formed at the pipe end portion satisfies a relationship of d≥Cr$^2$/(1000 Sn) (in the expression, Cr and Sn represent amounts (mass %) of respective elements).

[2] The ferritic stainless steel pipe having excellent corrosion resistance against salt damage in a crevice portion according to [1], further containing, by mass %, one or more of:
Ni: 0.1% to 1.0%;
Mo: 0.1% to 3.0%;
Cu: 0.10% to 3.00%;
B: 0.0001% to 0.0050%;
Nb: 0.001% to 0.300%;
W: 0.001% to 1.00%;
V: 0.001% to 0.50%;
Sb: 0.001% to 0.100%; and
Co: 0.001% to 0.500%.

[3] The ferritic stainless steel pipe having excellent corrosion resistance against salt damage in a crevice portion according to [1] or [2], further containing, by mass %, one or more of:
Ca: 0.0001% to 0.0050%;
Mg: 0.0001% to 0.0050%;
Zr: 0.0001% to 0.0300%;
Ga: 0.0001% to 0.0100%;
Ta: 0.001% to 0.050%; and
REM: 0.001% to 0.100%.

[4] The ferritic stainless steel pipe having excellent corrosion resistance against salt damage in a crevice portion according to any one of [1] to [3], which is used for a pipe-end-thickened structure.

[5] A pipe-end-thickened structure according to one aspect of the present invention, including the ferritic stainless steel pipe according to any one of [1] to [4].

[6] A welded joint according to one aspect of the present invention, including a pipe-end-thickened portion including the ferritic stainless steel pipe according to any one of [1] to [4].

[7] The welded joint according to [6], further including: a structure that is joined by being welded to the pipe-end-thickened portion, in which, when a sheet thickness of a single pipe portion of the ferritic stainless steel pipe is represented by t, a maximum penetration depth on a side of the ferritic stainless steel pipe in a welded portion is 0.3 t to 2.0 t.

[8] A welded structure according to one aspect of the present invention, including the welded joint according to [7].

Effects of the Invention

According to one aspect of the present invention, it is possible to provide a ferritic stainless steel pipe having excellent corrosion resistance against salt damage in a crevice portion (salt tolerance in a gap), a pipe-end-thickened structure including the same, a welded joint including a pipe-end-thickened portion, and a welded structure including the welded joint.

EMBODIMENTS FOR CARRYING OUT THE INVENTION

Hereinafter, embodiments of the present invention will be described in detail with reference to the drawings.

The inventors of the present invention have produced steel sheets of various compositions in order to evaluate corrosion resistance by imitating (simulating) a crevice environment of a pipe-end-thickened pipe (a ferritic stainless steel pipe). In addition, test pieces having different gap distances, which imitated a crevice portion of the pipe-end-thickened pipe, were produced by spot welding these steel sheets. A corrosion test was conducted for 100 cycles in accordance with a cosmetic corrosion test method for automotive parts of JASO-M610-92, and salt damage corrosion in a crevice portion was evaluated. For evaluation, a maximum pitting corrosion depth was used, and a sample with a maximum pitting corrosion depth of less than 500 μm was evaluated as "○" (good), while a sample with a maximum pitting corrosion depth of 500 μm or more was evaluated as "x" (poor).

Figure 3:
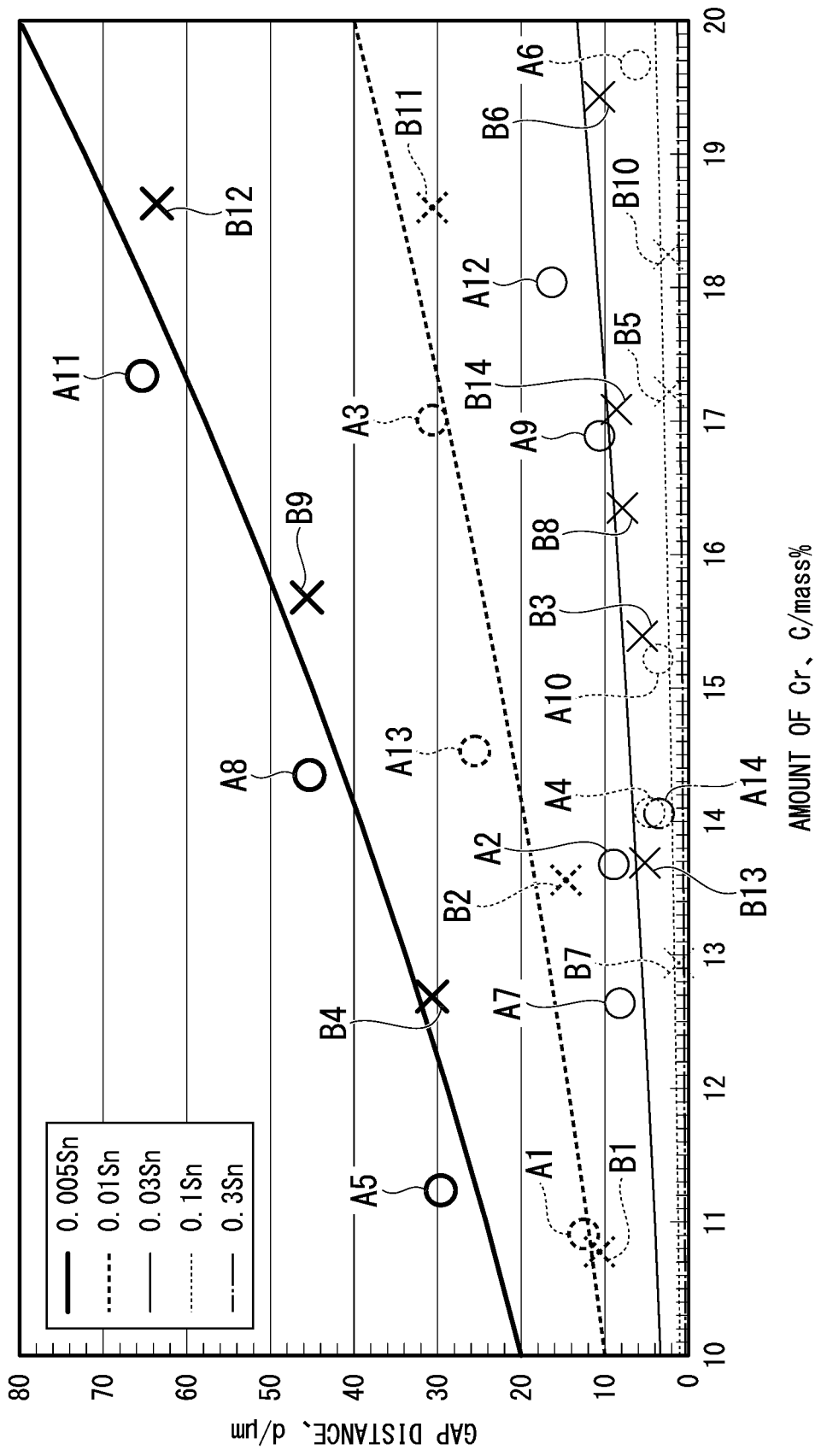
FIG. 3 is a graph showing a relationship between an amount of Cr and an amount of Sn in the pipe-end-thickened pipe manufactured in Examples, and a critical gap distance.

FIG. 3 shows a relationship between an amount of Cr in a base material and a critical gap distance at which corrosion in a crevice portion is suppressed with regard to various amounts of Sn in the base materials, based on the above-described test results. Cr in the base material improves corrosion resistance in a general environment, but as can be seen from FIG. 3, as the amount of Cr in the base material increases, a pitting corrosion depth in a crevice environment increases. In addition, it was found that a critical gap distance becomes small as the amount of Sn added to a steel sheet increases (as the amount of Sn in the base material increases).

By observing a corrosion form in a crevice portion of a steel type having a high Cr amount, it was found that a few pitting corrosion were deeply grown. On the other hand, in a corrosion form in a crevice portion of a steel type having a low Cr amount, it was found that a large amount of pitting corrosion occurred, but a depth of each pitting corrosion was shallower than that in the steel type having a high Cr amount.

In the case of the steel type having a high Cr amount, it is considered that the number of occurrences of pitting corrosion was reduced because a concentration of Cr in a passivation film was high and corrosion resistance was high. For this reason, it is considered that an oxygen reduction reaction which was a cathode reaction contributed only to the growth of a small number of pitting corrosions, and each pitting corrosion grew deep. On the other hand, in the case of the steel type having a low Cr amount, it is considered that a cathode reaction contributed to the occurrence of a large number of pitting corrosions; and therefore, a depth of each pitting corrosion did not grow large.

In addition, by the above-mentioned test, it was found that Sn is effective against the occurrence of pitting corrosion in a crevice environment. It is known that Sn suppresses active dissolution of stainless steel and improves crevice corrosion resistance. However, the fact that Sn suppresses the occurrence of pitting corrosion in a crevice environment and reduces a critical gap distance is a new finding obtained from the test results.

(Ferritic Stainless Steel Pipe)

A chemical composition of the steel specified in the present embodiment will be described in more detail below. "%" means mass %.

C: C reduces intergranular corrosion resistance and workability of the steel; and therefore, an amount of C needs to be limited to a low level. Accordingly, the amount of C is set to be 0.100% or less. However, it is desirable to set the amount of C to be 0.001% or more, because when the amount thereof is excessively lowered, a refining cost increases. The amount of C is more preferably 0.003% to 0.050%, and is even more preferably 0.005% to 0.020%.

Si: Si is useful as a deoxidizing element, but when an excessive amount thereof is added, a material is hardened. Thus its amount is set to be 0.01% to 2.00%. The amount of Si is more preferably 0.02% to 0.80%, and is even more preferably 0.03% to 0.70%.

Mn: Mn is useful as a deoxidizing element, but when an excessive amount thereof is added, corrosion resistance deteriorates. Thus its amount is set to be 0.01% to 2.00%. The amount of Mn is more preferably 0.02% to 0.80%, and is even more preferably 0.03% to 0.70%.

P: P is an element that degrades workability, weldability, and corrosion resistance, and thus its amount needs to be limited. Accordingly, the amount of P is set to be 0.05% or less. However, when the amount of P is excessively reduced, a refining cost increases, and thus a lower limit thereof is set to 0.001%. The amount of P is more preferably 0.003% to 0.04%, and is even more preferably 0.005% to 0.03%.

S: S is an element that degrades corrosion resistance, and thus its amount needs to be limited. Accordingly, the amount of S is set to be 0.005% or less. However, when the amount of S is excessively reduced, a refining cost increases, and thus a lower limit thereof is set to 0.0001%. The amount of S is more preferably 0.0003% to 0.003%, and is even more preferably 0.0005% to 0.001%.

Cr: an amount of Cr is required to be at least 10.5% or more for securing corrosion resistance against salt damage and corrosion resistance against exhaust gas condensate water. As the amount of Cr increases, corrosion resistance is improved, but workability and manufacturability are lowered, and costs increase. Thus an upper limit thereof is set to be 20.0% or less. The amount of Cr is more preferably 11.0% to 19.0%, and is even more preferably 13.0% to 17.5%.

Sn: Sn is an element that improves corrosion resistance, and an amount thereof is required to be at least 0.001% or more. The amount of Sn of 0.001% to 0.009% is effective, but an increased amount of Sn is more effective. However, when an excessive amount thereof is added, workability and manufacturability are reduced, and thus its upper limit is set to be 0.600% or less. The amount of Sn is more preferably 0.002% to 0.500%, and is even more preferably 0.030% to 0.300%. In consideration of the cost, its amount is preferably 0.030% to 0.100%.

Ti: Ti is an element useful for improving corrosion resistance, and can be contained in an amount of 0.001% or more. However, when an excessive amount thereof is added, cost increases, and thus its upper limit is set to 1.000%. The amount of Ti is more preferably 0.002% to 0.500%, and is even more preferably 0.003% to 0.200%.

Al: Al is an element useful for refinement such as a deoxidizing effect and the like, and an amount of Al is required to be at least 0.001% or more. However, when an excessive amount thereof is added, coarse inclusions are formed; and thereby, corrosion resistance deteriorates. Thus, its upper limit is set to be 0.100% or less. The amount of Al is more preferably 0.005% to 0.080%, and is even more preferably 0.010% to 0.070%.

N: N degrades formability and corrosion resistance, and thus an amount of N is set to be 0.02% or less. However, when the amount thereof is excessively reduced, a refining cost increases, and thus its lower limit is set to 0.001%. The amount of N is more preferably 0.002% to 0.015%, and is even more preferably 0.003% to 0.010%.

The above-described elements are included in the chemical composition that is the basis of the ferritic stainless steel of the present embodiment, but in the present embodiment, the following elements can be further contained as needed.

Ni: Ni is an element useful for improving corrosion resistance, and can be contained in an amount of 0.1% or more. However, when an excessive amount thereof is added, cost increases, and thus its upper limit is set to 1.0%. The amount of Ni is more preferably 0.2% to 0.8%, and is even more preferably 0.3% to 0.5%.

Mo: Mo is an element useful for improving corrosion resistance, and can be contained in an amount of 0.1% or more. However, when an excessive amount thereof is added, cost increases, and thus its upper limit is set to 3.0%. The amount of Mo is more preferably 0.2% to 2.0%, and is even more preferably 0.3% to 1.5%.

Cu: Cu is an element useful for improving corrosion resistance, and can be contained in an amount of 0.10% or more. However, when an excessive amount thereof is added, cost increases, and thus its upper limit is set to 3.00%. The amount of Cu is more preferably 0.20% to 2.00%, and is even more preferably 0.30% to 1.50%.

B: B is an element useful for improving hot workability, and can be contained in an amount of 0.0001% or more. However, when an excessive amount thereof is added, corrosion resistance is reduced, and thus its upper limit is set to be 0.0050% or less. The amount of B is more preferably 0.0005% to 0.0030%, and is even more preferably 0.0010% to 0.0010%.

Nb: Nb is an element useful for improving corrosion resistance, and thus is preferably contained in an amount of 0.001% or more. However, when an excessive amount thereof is added, workability and manufacturability are reduced, and thus its upper limit is set to be 0.300% or less. The amount of Nb is more preferably 0.005% to 0.200%, and is even more preferably 0.010% to 0.100%.

W: W is an element useful for improving corrosion resistance, and thus is preferably contained in an amount of 0.001% or more. However, when an excessive amount thereof is added, workability and manufacturability are reduced, and thus its upper limit is set to 1.00% or less. The amount of W is more preferably 0.005% to 0.70%, and is even more preferably 0.010% to 0.50%.

V: V is an element useful for improving corrosion resistance, and thus is preferably contained in an amount of 0.001% or more. However, when an excessive amount thereof is added, workability and manufacturability are reduced, and thus its upper limit is set to 0.50% or less. The amount of V is more preferably 0.005% to 0.40%, and is even more preferably 0.010% to 0.30%.

Sb: Sb is an element useful for improving corrosion resistance, and thus is preferably contained in an amount of 0.001% or more. However, when an excessive amount thereof is added, workability and manufacturability are reduced, and thus its upper limit is set to be 0.100% or less. The amount of Sb is more preferably 0.005% to 0.080%, and is even more preferably 0.010% to 0.050%.

Co: Co improves secondary workability and toughness, and thus is preferably contained in an amount of 0.001% or more. However, when an excessive amount thereof is added, workability and manufacturability are reduced, and thus its upper limit is set to be 0.500% or less. The amount of Co is more preferably 0.002% to 0.400%, and is even more preferably 0.003% to 0.300%.

A total amount of one or more of Ni, Mo, Cu, B, Nb, W, V, Sb, and Co is preferably 6% or less from the viewpoint of cost increase and the like.

Ca: Ca improves desulfurization and hot workability, and thus is preferably contained in an amount of 0.0001% or more. However, when an excessive amount thereof is added, water-soluble inclusion CaS is generated; and thereby, corrosion resistance deteriorates. Thus, its upper limit is set to 0.0050%. The amount of Ca is more preferably 0.0002% to 0.0045%, and is even more preferably 0.0003% to 0.0040%.

Mg: Mg refines a structure and improves workability and toughness, and thus is preferably contained in an amount of 0.0001% or more. However, when an excessive amount thereof is added, hot workability deteriorates, and thus its upper limit is set to 0.0050%. The amount of Mg is more preferably 0.0003% to 0.0040%, and is even more preferably 0.0005% to 0.0030%.

Zr: Zr improves corrosion resistance, and thus is preferably contained in an amount of 0.0001% or more. However, when an excessive amount thereof is added, workability and manufacturability are reduced, and thus its upper limit is set to 0.0300%. The amount of Zr is more preferably 0.0005% to 0.0200%, and is even more preferably 0.0010% to 0.0100%.

Ga: Ga improves corrosion resistance and hydrogen embrittlement resistance, and thus is preferably contained in an amount of 0.0001% or more. However, when an excessive amount thereof is added, workability and manufacturability are reduced, and thus its upper limit is set to 0.0100%. The amount of Ga is more preferably 0.0005% to 0.0080%, and is even more preferably 0.0010% to 0.0050%.

Ta: Ta improves corrosion resistance, and thus is preferably contained in an amount of 0.001% or more. However, when an excessive amount thereof is added, workability and manufacturability are reduced, and thus its upper limit is set to 0.050%. The amount of Ta is more preferably 0.005% to 0.040%, and is even more preferably 0.010% to 0.030%.

REM: REM has a deoxidizing effect and the like; and therefore, REM is an element useful for refining. Accordingly, it is preferably contained in an amount of 0.001% or more. However, when an excessive amount thereof is added, workability and manufacturability are reduced, and thus its upper limit is set to 0.100%. The amount of REM is more preferably 0.005% to 0.080%, and is even more preferably 0.010% to 0.050%.

REM is a rare earth metal such as Ce, La, Pr, Nd, and the like. The "amount of REM" means a total value of amounts of all the REM elements. In the case where a total amount is within the above-described range, the same effect can be obtained regardless of whether the type of REM element is one or two or more.

Figure 1:
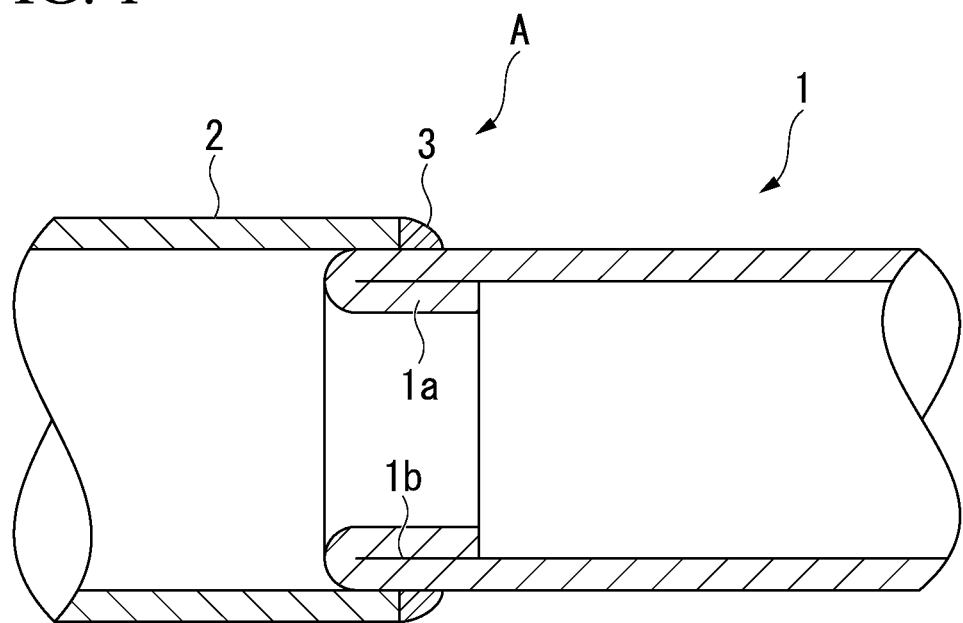
FIG. 1 is a cross-sectional view showing a joint structure of a pipe-end-thickened pipe consisting of a stainless steel pipe and another steel pipe.

The ferritic stainless steel pipe of the present embodiment includes a pipe-end-thickened portion 1a at a pipe end portion as shown in FIG. 1. The pipe-end-thickened portion 1a is a portion where a thickness is increased at the pipe end portion of a steel pipe. For example, the pipe-end-thickened portion 1a is formed by bending the end portion of a steel pipe by 180° inward or outward. For this reason, the pipe-end-thickened portion 1a includes an end portion which is folded back inside or outside. In the pipe-end-thickened portion 1a, a crevice portion (gap, gap portion) 1b exists between the outer portion (outer peripheral portion) and the inner portion (inner peripheral portion) of the stainless steel pipe. That is, in the pipe end portion of the steel pipe, the crevice portion 1b exists between the steel pipe and the folded-back portion of the steel pipe. The maximum value of a gap distance between the steel pipe and the folded portion of the steel pipe is referred to as a gap distance d (μm).

The gap distance d (μm) present at the pipe end portion satisfies a relationship of $d \geq Cr^2/(1000\ Sn)$ (in the expression, Cr and Sn represent amounts (mass %) of respective elements).

The pipe-end-thickened pipe (ferritic stainless steel pipe) of the present embodiment is made of a stainless steel sheet having a steel component specified in the present embodiment, and a method of manufacturing the stainless steel sheet includes each step of steel manufacturing, hot rolling, annealing and pickling, cold rolling, and annealing, and manufacturing conditions of each step are not particularly defined.

In steel manufacturing, it is preferable to use a method of melting steel containing the above-mentioned essential components and components which are added as necessary in a converter and then performing secondary refining. The molten steel is made into a slab according to a known casting method (continuous casting). The slab is heated to a predetermined temperature and is subjected to hot rolling by continuous rolling to have a predetermined thickness. The annealing process after hot rolling may be omitted, and cold rolling after pickling may be carried out using any one of a general Sendzimir mill or tandem mill, but in consideration of bendability of the steel pipe, the tandem mill rolling is preferable.

In cold rolling, the roll roughness, the roll diameter, the rolling oil, the number of rolling passes, the rolling speed, the rolling temperature, and the like may be appropriately selected within general ranges. Intermediate annealing may be conducted in the middle of cold rolling, and the intermediate annealing and final annealing may be batch annealing or continuous annealing. With regard to the annealing atmosphere, if necessary, the annealing may be bright annealing performed in a non-oxidizing atmosphere such as hydrogen gas or nitrogen gas, or the annealing may be performed in the air. Furthermore, the present product sheet may be coated with a dry lubricating film; and thereby, the press formability may be further improved, and the type of the lubricating film may be appropriately selected. Although temper rolling or leveling may be employed for shape correction after final annealing, it is preferable not to employ these steps because they lead to a decrease in work hardenability.

The method of manufacturing the steel pipe may be appropriately selected, and the welding method is not limited, but ERW (resistance welding), laser welding, TIG welding (tungsten inert gas welding) or the like may be appropriately selected. In addition, the size of the steel pipe may be determined according to the use application. The process of pipe-end thickening from the steel pipe is preferably a spinning process or a forging process of the pipe end, but these processes are not particularly limited.

Furthermore, the case of thickening the outside of the pipe and the case of thickening the inside of the pipe are conceivable, and in the case of thickening the outside of the pipe, the inside diameter of the thickened portion is the same as the raw pipe. On the other hand, in the case of thickening the inside of the pipe, the outer diameter of the thickened portion is the same as the raw pipe. In consideration of working efficiency and dimensional accuracy, it is preferable to employ a spinning process, and it is preferable to employ a method in which a pipe end is bent once and brought into close contact with the pipe in the next step.

In the case where a gap distance d formed at the pipe end portion satisfies the above-mentioned relational expression, it is possible to realize a ferritic stainless steel pipe capable of providing a pipe-end-thickened structure excellent in corrosion resistance against salt damage in a crevice portion.

By using a ferritic stainless steel pipe satisfying the above-mentioned composition and relational expression, especially as an automobile part and a motorcycle part, it becomes possible to reduce the thickness, it is possible to perform efficient manufacture of parts, and it is possible to improve fuel consumption of applied automobiles and motorcycles.

In addition, according to the ferritic stainless steel pipe satisfying the above-described composition and relational expression, it is possible to provide a welded joint and a welded structure including a pipe-end-thickened portion excellent in corrosion resistance against salt damage in a crevice portion.

(Pipe-End-Thickened Structure, Welded Joint, and Welded Structure)

As described above, the ferritic stainless steel pipe of the present embodiment has a composition containing C, Si, Mn, P, S, Cr, Sn, Ti, Al, and N in amounts within the specified ranges, and it is a stainless steel pipe for a pipe-end-thickened structure which is thickened on the outside of the pipe or thickened on the inside of the pipe.

The pipe-end-thickened structure of the present embodiment includes the ferritic stainless steel pipe of the present embodiment. The pipe-end-thickened structure is a structure including a steel pipe, and a pipe-end-thickened portion is provided in this steep pipe. In the present embodiment, it is possible to provide the pipe-end-thickened structure in which a gap distance d (μm) formed at the pipe end portion satisfies a relationship of $d \geq Cr^2/(1000\ Sn)$ (in the expression, Cr and Sn represent amounts (mass %) of respective elements).

This pipe-end-thickened structure has a feature of being excellent in corrosion resistance against salt damage in a crevice portion.

The welded joint of the present embodiment includes a pipe-end-thickened portion consisting of the ferritic stainless steel pipe of the present embodiment. That is, this welded joint includes a pipe-end-thickened portion of the ferritic stainless steel pipe of the present embodiment. In other words, the welded joint of the present embodiment includes the ferritic stainless steel pipe of the present embodiment, and a pipe-end-thickened portion is provided in this steep pipe.

The welded joint of the present embodiment includes a pipe-end-thickened portion having excellent corrosion resistance against salt damage in a crevice portion.

By using the welded joint of the present embodiment, especially as an automobile part and a motorcycle part, it becomes possible to reduce the thickness of the part, it is possible to perform efficient manufacture of parts, and it is possible to improve fuel consumption of applied automobiles and motorcycles.

FIG. 1 shows a joint A in which another steel pipe 2 is joined by welding to a pipe-end-thickened structure 1 including the above-described ferritic stainless steel pipe.

The pipe end portion of the pipe-end-thickened structure 1 is provided with a portion folded inside to form the pipe-end-thickened portion 1a. In other words, the pipe-end-thickened portion 1a in FIG. 1 is formed by bending the end portion of a steel pipe by 180° inward. A steel pipe 2 is joined to the outside of the pipe-end-thickened portion 1a by a welded portion (weld zone) 3.

A crevice portion 1b is formed between the outer and inner portions of the stainless steel pipe in the pipe-end-thickened portion 1a.

In the joint A having the structure shown in FIG. 1, the crevice portion 1b having a gap distance d satisfying the above-mentioned relational expression is formed according to the above-described composition of the ferritic stainless steel pipe. Accordingly, excellent corrosion resistance against salt damage in a crevice portion can be obtained.

When welding the pipe-end-thickened pipe (ferritic stainless steel pipe) to a structure, any welding method may be employed as described above. Examples of the structure include a steel pipe and the like.

In the case where a structure is joined by being welded to a pipe-end-thickened portion of a ferritic stainless steel pipe (the case where the welded joint further includes a structure joined by being welded to the pipe-end-thickened portion), when a sheet thickness of the single pipe portion is represented by t, it is preferable for the maximum penetration depth on the side of the ferritic stainless steel pipe in the welded portion to be 0.3 t to 2.0 t.

The maximum penetration depth is measured by the following method. A cross section of the welded portion is observed, and in the welded portion, the deepest melted point is taken as the maximum penetration portion, and the depth thereof is taken as the maximum penetration depth.

Figure 2:
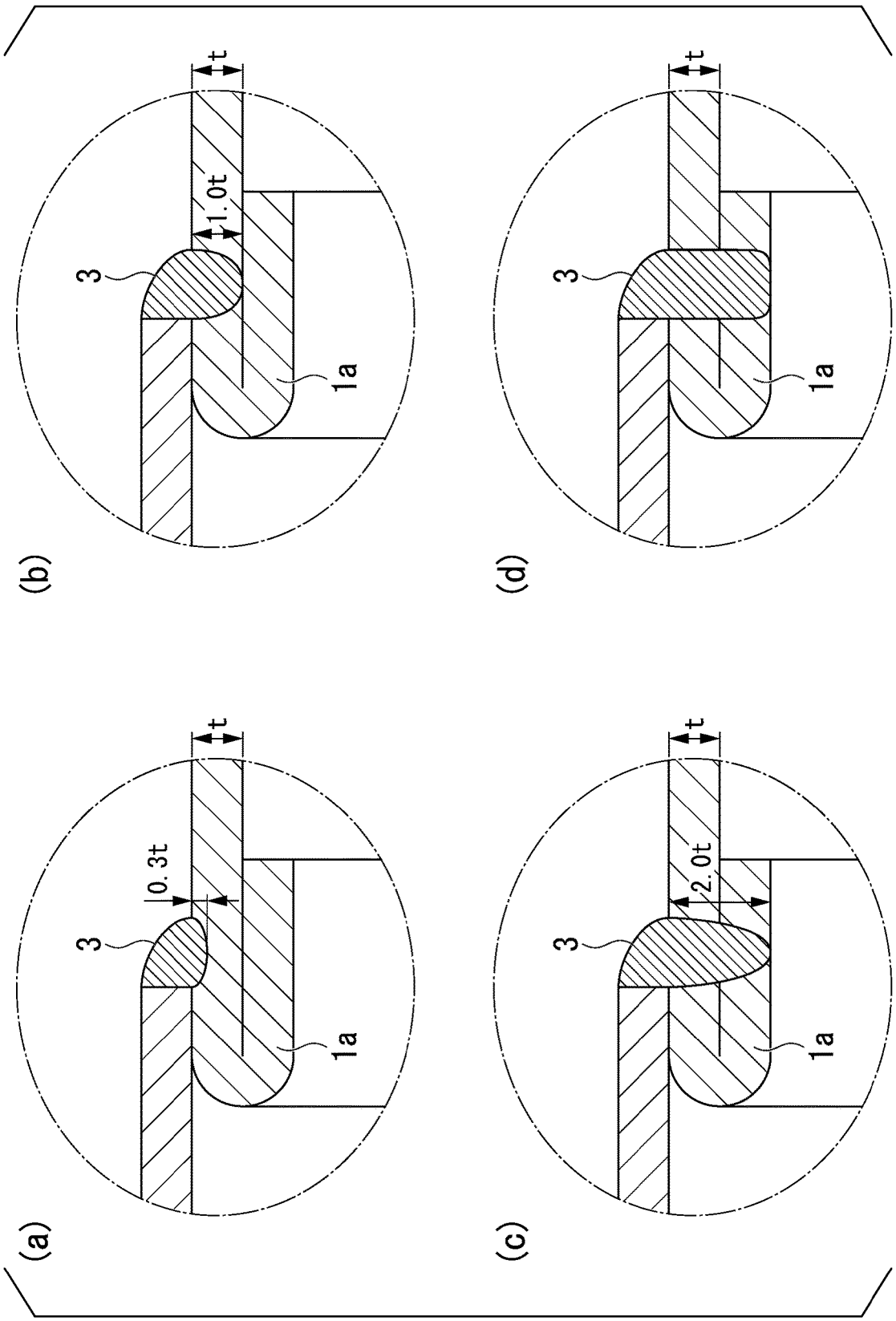
FIG. 2 is an enlarged view of the periphery of a welded portion (weld zone) 3 in FIG. 1, and when a thickness of a single pipe portion of a ferritic stainless steel pipe is represented by t, (a) shows a case where a maximum penetration depth is 0.3 t, (b) shows a case where a maximum penetration depth is 1.0 t, (c) shows a case where a maximum penetration depth is 2.0 t, and (d) shows a case where a maximum penetration depth is more than 2.0 t.

FIG. 2 shows an enlarged view of the periphery of the welded portion 3 in FIG. 1. When a thickness of a single pipe portion of a ferritic stainless steel pipe is represented by t, FIG. 2(a) shows a case where a maximum penetration depth is 0.3 t, FIG. 2(b) shows a case where a maximum penetration depth is 1.0 t, FIG. 2(c) shows a case where a maximum penetration depth is 2.0 t, and FIG. 2(d) shows a case where a maximum penetration depth is more than 2.0 t.

FIGS. 1 and 2 show a case where welding is performed by bringing the electrode/arc close to the outer peripheral surface side of the pipe-end-thickened portion to form the welded portion 3. For this reason, the outer peripheral surface of the pipe-end-thickened portion becomes a surface on the electrode/arc side, and the inner peripheral surface of the pipe-end-thickened portion becomes a surface (rear surface) opposite to the electrode/arc side surface. A distance (depth) from the outer peripheral surface of the pipe-end-thickened portion to the maximum penetration portion is the maximum penetration depth.

As shown in FIG. 2, in the case where the maximum penetration portion does not reach the inner peripheral surface of the pipe-end-thickened portion, the maximum penetration depth is less than 2.0 t. In the case where the maximum penetration portion just reaches the inner peripheral surface of the pipe-end-thickened portion, the maximum penetration depth is 2.0 t. In the case where the maximum penetration portion reaches the inner peripheral surface of the pipe-end-thickened portion, and a melted portion (weld fusion zone) is also at the inner peripheral surface, the maximum penetration depth is more than 2.0 t. In other words, the case where the maximum penetration depth exceeds 2.0 t is the case where a melted portion is present on the surface (rear surface) opposite to the surface on the electrode/arc side at the time of welding.

By setting the maximum penetration depth to be 0.3 t or more, the strength of the welded portion is secured, and a welded joint and a welded structure to be described later are obtained which include a pipe-end-thickened portion excellent in corrosion resistance against salt damage in a crevice portion. In the case where the maximum penetration depth exceeds 2.0 t, the shape of the welded portion becomes nonuniform, which may lead to various problems such as a reduction in strength, deterioration in corrosion resistance, and leakage of exhaust gas.

The following is the reason why the welded joint including the pipe-end-thickened portion having excellent corrosion resistance against salt damage in a crevice portion can be obtained.

By setting the maximum penetration depth to be 0.3 t or more, the shape of the welded portion on the outer side of the pipe-end-thickened pipe (ferritic stainless steel pipe) is stabilized, and a crevice structure that can be a corrosion starting point cannot be formed. The maximum penetration depth is preferably more than 1.0 t, and in this case, the inner gap of the pipe-end-thickened pipe (ferritic stainless steel pipe) is also closed, and the crevice structure which can be a corrosion starting point is further reduced. In addition, the ferritic stainless steel pipe contains Sn in an amount of 0.001 to 0.600% in the steel. Accordingly, even in the case where corrosion occurs, the eluted $Sn^{2+}$ ions are adsorbed on the dissolution surface, it is possible to limit the further elution of the steel base material, and it is possible to avoid the deterioration of the corrosion resistance of the welded portion.

In order to achieve this welded portion, a selected shielding gas is required, particularly in welding where a shielding gas is required. In particular, the pipe-end-thickened portion includes many crevice structures. In other words, the pipe-end-thickened portion has a structure in which many gaps (crevice portions) are present. For this reason, it is preferable to perform appropriate shielding with an inert gas. Specifically, Ar is most preferable as the shielding gas. In the case where $CO_2$ or $O_2$ is mixed in the shielding gas, it is preferable to set an amount of $CO_2$ or $O_2$ to be 5% by volume or less.

In other words, the method of manufacturing the welded joint of the present embodiment includes a step of welding and joining the pipe-end-thickened portion of the ferritic stainless steel pipe of the present embodiment to the structure. In the joining step by welding, it is preferable to perform welding while supplying a shielding gas to the welded portion. The shielding gas may be, for example, an inert gas such as Ar, or a mixed gas of an inert gas and either one or both of $CO_2$ and $O_2$. The amount of $CO_2$ and $O_2$ in the mixed gas is preferably 5% by volume or less.

In particular, in the case where the welding method is TIG welding, MIG welding, or MAG welding, it is preferable to perform welding while supplying a shielding gas to the welded portion. In the case where the welding method is laser welding, a shielding gas may not be supplied.

The welded structure of the present embodiment includes the welded joint of the present embodiment, this welded joint further includes a structure that is joined by being welded to the pipe-end-thickened portion, and when a sheet thickness of a single pipe portion of the ferritic stainless steel pipe is represented by t, a maximum penetration depth on a side of the ferritic stainless steel pipe in the welded portion is 0.3 t to 2.0 t.

According to the ferritic stainless steel pipe satisfying the above-described composition and relational expression, it is possible to provide a welded joint and a welded structure which include a pipe-end-thickened portion excellent in corrosion resistance against salt damage in a crevice portion.

In addition, by using this welded joint and welded structure, especially as an automobile part and a motorcycle part, it becomes possible to reduce the thickness of the part, it is possible to perform efficient manufacture of parts, and it is possible to improve fuel consumption of applied automobiles and motorcycles.

In the examples to be described later, a test was conducted for understanding the corrosion resistance against salt damage in a crevice portion of this type of joint such as the joint A having a structure of FIG. 1, and the influence of the elements constituting the ferritic stainless steel pipe and the critical gap distance were tested.

EXAMPLES

Hereinafter, the present invention will be described in more detail based on examples.

Example 1

A steel having the composition shown in Tables 1 and 2 was melted. In particular, the amount of Sn was set to five levels of 0.005%, 0.01%, 0.03%, 0.10%, and 0.30% in order to investigate an effect thereof. The steel after melting was subjected to hot rolling to have a sheet thickness of 4 mm, and then was annealed at 1050° C. for 1 minute, and pickled. Thereafter, the steel was subjected to cold rolling to have a sheet thickness of 0.8 mm.

TABLE 1

| Steel type No. | Chemical composition (mass %) | | | | | | | | | |
|---|---|---|---|---|---|---|---|---|---|---|
| | C | Si | Mn | P | S | Cr | Sn | Ti | Al | N | Other elements |
| A1 | 0.010 | 0.41 | 0.28 | 0.030 | 0.0006 | 10.91 | 0.010 | 0.20 | 0.053 | 0.009 | |
| A2 | 0.005 | 0.04 | 0.06 | 0.032 | 0.0009 | 13.68 | 0.030 | 0.16 | 0.081 | 0.008 | Nb: 0.01 |
| A3 | 0.004 | 0.05 | 0.07 | 0.026 | 0.0006 | 17.01 | 0.010 | 0.22 | 0.090 | 0.001 | Ni: 0.10, Mo: 0.11 |
| A4 | 0.005 | 0.09 | 0.11 | 0.025 | 0.0010 | 14.07 | 0.100 | 0.08 | 0.043 | 0.008 | Nb: 0.12 |
| A5 | 0.011 | 0.25 | 0.26 | 0.022 | 0.0003 | 11.24 | 0.005 | 0.15 | 0.019 | 0.011 | REM: 0.051 |
| A6 | 0.009 | 0.16 | 0.26 | 0.036 | 0.0007 | 19.67 | 0.100 | 0.19 | 0.016 | 0.007 | V: 0.11 |
| A7 | 0.016 | 0.28 | 0.84 | 0.010 | 0.0008 | 12.64 | 0.030 | 0.34 | 0.049 | 0.003 | Cu: 0.36 |
| A8 | 0.003 | 0.29 | 0.35 | 0.021 | 0.0004 | 14.35 | 0.005 | 0.16 | 0.026 | 0.013 | |
| A9 | 0.034 | 0.68 | 0.63 | 0.005 | 0.0013 | 16.89 | 0.030 | 0.26 | 0.087 | 0.004 | W: 0.21 |
| A10 | 0.007 | 0.93 | 0.52 | 0.046 | 0.0009 | 15.22 | 0.100 | 0.21 | 0.036 | 0.007 | B: 0.0032 |
| A11 | 0.002 | 0.14 | 0.47 | 0.015 | 0.0010 | 17.34 | 0.005 | 0.17 | 0.035 | 0.002 | Co: 0.046 |
| A12 | 0.009 | 0.03 | 0.77 | 0.023 | 0.0032 | 18.04 | 0.030 | 0.35 | 0.047 | 0.006 | Sb: 0.007 |
| A13 | 0.014 | 0.05 | 0.43 | 0.020 | 0.0027 | 14.53 | 0.010 | 0.21 | 0.059 | 0.004 | |
| A14 | 0.010 | 0.34 | 0.29 | 0.026 | 0.0008 | 14.06 | 0.300 | 0.15 | 0.044 | 0.011 | |

TABLE 2

| Steel type No. | Chemical composition (mass %) | | | | | | | | | |
|---|---|---|---|---|---|---|---|---|---|---|
| | C | Si | Mn | P | S | Cr | Sn | Ti | Al | N | Other elements |
| B1 | 0.027 | 0.57 | 0.09 | 0.013 | 0.0008 | 10.78 | 0.010 | 0.14 | 0.028 | 0.005 | |
| B2 | 0.006 | 0.64 | 0.19 | 0.019 | 0.0003 | 13.56 | 0.010 | 0.19 | 0.017 | 0.004 | |
| B3 | 0.005 | 0.43 | 0.64 | 0.048 | 0.0001 | 15.39 | 0.030 | 0.13 | 0.032 | 0.010 | Co: 0.129 |
| B4 | 0.013 | 0.35 | 0.29 | 0.036 | 0.0002 | 12.69 | 0.005 | 0.36 | 0.017 | 0.004 | |
| B5 | 0.039 | 0.29 | 0.58 | 0.032 | 0.0007 | 17.22 | 0.100 | 0.25 | 0.028 | 0.003 | |
| B6 | 0.003 | 0.03 | 1.03 | 0.040 | 0.0021 | 19.43 | 0.030 | 0.38 | 0.019 | 0.003 | W: 0.12 |
| B7 | 0.008 | 1.25 | 0.73 | 0.029 | 0.0036 | 12.94 | 0.100 | 0.13 | 0.016 | 0.006 | |
| B8 | 0.003 | 0.67 | 0.42 | 0.027 | 0.0007 | 16.35 | 0.030 | 0.06 | 0.009 | 0.003 | B: 0.0029 |
| B9 | 0.015 | 0.27 | 0.36 | 0.015 | 0.0003 | 15.68 | 0.005 | 0.34 | 0.032 | 0.003 | |
| B10 | 0.004 | 0.59 | 0.23 | 0.036 | 0.0014 | 18.25 | 0.100 | 0.47 | 0.003 | 0.005 | REM: 0.039 |
| B11 | 0.011 | 0.42 | 0.29 | 0.031 | 0.0007 | 18.60 | 0.010 | 0.21 | 0.054 | 0.010 | |
| B12 | 0.002 | 0.36 | 0.14 | 0.022 | 0.0005 | 18.63 | 0.005 | 0.28 | 0.044 | 0.017 | |
| B13 | 0.001 | 0.05 | 0.07 | 0.033 | 0.0010 | 13.69 | 0.030 | 0.17 | 0.083 | 0.009 | Nb: 0.01 |
| B14 | 0.005 | 0.06 | 0.08 | 0.027 | 0.0007 | 17.09 | 0.030 | 0.23 | 0.098 | 0.016 | Ni: 0.10, Mo: 0.04 |

TABLE 2-continued

| Steel type No. | Chemical composition (mass %) | | | | | | | | | | |
|---|---|---|---|---|---|---|---|---|---|---|---|
| | C | Si | Mn | P | S | Cr | Sn | Ti | Al | N | Other elements |
| A1' | 0.010 | 0.41 | 0.28 | 0.030 | 0.0006 | 10.91 | 0.010 | 0.20 | 0.053 | 0.009 | |
| A2' | 0.005 | 0.04 | 0.06 | 0.032 | 0.0009 | 13.68 | 0.030 | 0.16 | 0.081 | 0.008 | Nb: 0.01 |
| A3' | 0.004 | 0.05 | 0.07 | 0.026 | 0.0006 | 17.01 | 0.010 | 0.22 | 0.090 | 0.012 | Ni: 0.10, Mo: 0.04 |
| A4' | 0.005 | 0.09 | 0.11 | 0.025 | 0.0010 | 14.07 | 0.100 | 0.08 | 0.043 | 0.008 | Nb: 0.12 |
| A5' | 0.011 | 0.25 | 0.26 | 0.022 | 0.0003 | 11.24 | 0.005 | 0.15 | 0.019 | 0.011 | REM: 0.051 |
| A6' | 0.009 | 0.16 | 0.26 | 0.036 | 0.0007 | 19.67 | 0.100 | 0.19 | 0.016 | 0.007 | V: 0.11 |

Then, test pieces having dimensions of 70 mm×70 mm and test pieces having dimensions of 40 mm×40 mm were cut out from the steel sheet having each composition shown in Tables 1 and 2, and the test pieces having the same composition were overlapped (stacked) and spot-welded. Thereby, CCT specimens which imitated crevice portions of a pipe-end-thickened pipe were produced. By adjusting spot welding conditions, the CCT specimens having different gap distances were produced.

These CCT specimens were evaluated by a cosmetic corrosion test method for automotive parts of JASO-M610-92. The number of cycles was set to 100 cycles, and after the test, the spot-welded portion was hollowed out, and two sheets were separated so that a maximum pitting corrosion depth in the crevice portion could be evaluated. After removing rust, pitting corrosion depths in each of the test pieces which were the upper and lower parts of the crevice portion were measured at 10 points, and the deepest pitting value was taken as the maximum pitting corrosion depth of the steel type. A sample with the maximum pitting corrosion depth of less than 500 μm was evaluated as "○" (good), and a sample with the maximum pitting corrosion depth of 500 μm or more was evaluated as "x" (poor).

Table 3 shows calculation results of ($Cr^2/(1000\ Sn)$) values (Cr and Sn indicate the amounts (mass %) of respective elements) of stainless steels having respective compositions shown in Tables 1 and 2, values (μm) of the gap distances d, the maximum pitting corrosion depths (μm) obtained by the cosmetic corrosion test method for automotive parts (JASO-M610-92), and the judgment results.

TABLE 3

| | Steel type No. | Value of $Cr^2/(1000\ Sn)$ | Gap distance (μm) | Maximum pitting corrosion depth (μm) | Determination |
|---|---|---|---|---|---|
| Example of present invention | A1 | 11.9 | 12.5 | 395 | ○ |
| | A2 | 6.2 | 8.9 | 298 | ○ |
| | A3 | 28.9 | 30.6 | 196 | ○ |
| | A4 | 2.0 | 4.6 | 487 | ○ |
| | A5 | 25.3 | 29.6 | 298 | ○ |
| | A6 | 3.9 | 6.3 | 209 | ○ |
| | A7 | 5.3 | 8.2 | 198 | ○ |
| | A8 | 41.2 | 45.3 | 308 | ○ |
| | A9 | 9.5 | 10.6 | 387 | ○ |
| | A10 | 2.3 | 3.6 | 344 | ○ |
| | A11 | 60.1 | 65.3 | 410 | ○ |
| | A12 | 10.8 | 16.3 | 206 | ○ |
| | A13 | 21.1 | 25.5 | 472 | ○ |
| | A14 | 0.7 | 3.5 | 248 | ○ |
| Comparative Example | B1 | 11.6 | 10.6 | 510 | x |
| | B2 | 18.4 | 14.6 | 623 | x |
| | B3 | 7.9 | 5.5 | 509 | x |
| | B4 | 32.2 | 30.6 | 526 | x |
| | B5 | 3.0 | 2.3 | 820 | x |
| | B6 | 12.6 | 10.6 | 507 | x |
| | B7 | 1.7 | 1.1 | 562 | x |
| | B8 | 8.9 | 7.9 | 559 | x |
| | B9 | 49.2 | 45.6 | 602 | x |
| | B10 | 3.3 | 2.4 | 609 | x |
| | B11 | 34.6 | 30.6 | 812 | x |
| | B12 | 69.4 | 63.5 | 533 | x |
| | B13 | 6.2 | 5.2 | 732 | x |
| | B14 | 9.7 | 8.6 | 636 | x |
| | A1' | 11.9 | 12.5 | 395 | ○ |
| | A2' | 6.2 | 8.9 | 298 | ○ |
| | A3' | 28.9 | 30.6 | 196 | ○ |
| | A4' | 2.0 | 4.6 | 487 | ○ |
| | A5' | 25.3 | 29.6 | 298 | ○ |
| | A6' | 3.9 | 6.3 | 209 | ○ |

As shown in the graph of FIG. 3, the results shown in Tables 1 to 3 were plotted, with a horizontal axis indicating an amount of Cr (mass %) of each sample and a vertical axis indicating a gap distance (d: μm) of each sample. In addition, an amount of Sn of each sample was shown.

In FIG. 3, the short dashed line indicates a curve represented by $d=Cr^2/(1000\ Sn)$ in the case where the amount of Sn is 0.10%. Regarding Sample Nos. A4, A6, A10, B5, B7, and B10 having an amount of Sn of 0.10%, the gap distances d of Sample Nos. A4, A10, and A6 were values above this short dashed line, and the gap distances d of Sample Nos. B7, B5, and B10 were values below this short dashed line.

In FIG. 3, the solid line indicates a curve represented by $d=Cr^2/(1000\ Sn)$ in the case where the amount of Sn is 0.030%. Regarding Sample Nos. A2, A7, A9, A12, B3, B6, B8, B13, and B14 having an amount of Sn of 0.030%, the gap distances d of Sample Nos. A7, A2, A9, and A12 were values above this solid line, and the gap distances d of Sample Nos. B13, B3, B8, B14, and B6 were values below this solid line.

In FIG. 3, the long dashed line indicates a curve represented by $d=Cr^2/(1000\ Sn)$ in the case where the amount of Sn is 0.010%. Regarding Sample Nos. A1, A3, A13, B1, B2, and B11 having an amount of Sn of 0.010%, the gap distances d of Sample Nos. A1, A13, and A3 were values above this long dashed line, and the gap distances d of Sample Nos. B1, B2, and B11 were values below this long dashed line.

In FIG. 3, the thick solid line indicates a curve represented by $d=Cr^2/(1000\ Sn)$ in the case where the amount of Sn is 0.005%. Regarding Sample Nos. A5, A8, A11, B4, B9, and B12 having an amount of Sn of 0.005%, the gap distances d of Sample Nos. A5, A8, and A11 were values above this thick solid line, and the gap distances d of Sample Nos. B4, B9, and B12 were values below this thick solid line.

In Sample Nos. A1 to A14 of the examples of the present invention, the maximum pitting corrosion depth was less than 500 μm, and in Sample Nos. B1 to B14 of the comparative examples, the maximum pitting corrosion depth was 500 μm or more.

Accordingly, based on the results shown in FIG. 3, it can be understood that, in the pipe-end-thickened structure including the ferritic stainless steel pipe of the present embodiment, the gap distance d (m) satisfies a relationship of $d \geq Cr^2/(1000 \, Sn)$ (in the expression, Cr and Sn represent amounts (mass %) of respective elements); and thereby, it is possible to provide a pipe-end-thickened structure having a small maximum pitting corrosion depth.

In addition, as shown in FIG. 3, in the ferritic stainless steel pipe according to the present embodiment, it is understood that the pitting corrosion depth in the crevice environment increases as the amount of Cr in the base material increases. Furthermore, it can be understood that, in the ferritic stainless steel pipe according to present embodiment, a critical gap distance becomes small as Sn is added.

Example 2

A steel pipe (pipe) having a diameter of 60 mm was produced by TIG welding using a steel sheet having a composition shown in Tables 1 and 2. By the spinning process, the end portion of the steel pipe was bent by 180° inward to produce a pipe-end-thickened portion having a length of 50 mm. Thereby, a pipe-end-thickened pipe was produced in which a diameter was 60 mm and a length of an end portion (pipe-end-thickened portion) folded back inside was 50 mm. Then, the pipe-end-thickened pipe was cut at a length of 60 mm from the folded portion.

A gap distance of the crevice portion in the pipe-end-thickened portion was set to various values by adjusting the conditions of spinning processing.

A single pipe having a diameter of 62 mm was produced using the same steel sheet. Welding was performed by various methods (TIG welding, MIG welding, MAG welding, or laser welding) in a state where a single pipe manufactured from the same steel sheet was stacked on the outside of the pipe-end-thickened portion of the pipe-end-thickened pipe, so that the end portion (pipe-end-thickened portion) folded back inside of the pipe-end-thickened pipe became the welded portion. Thereby, a CCT specimen was produced in which a total length was 100 mm and a welded portion of a single pipe portion (single pipe) and a pipe-end-thickened portion was positioned at the center.

During welding by various methods, an amount of current was controlled so as to adjust the penetration depth of the welded portion, and the influence of the penetration depth on corrosion resistance was examined. In addition, in the case of welding using a shielding gas, welding was performed using various shielding gases, and the influence of the shielding gas on corrosion resistance was also examined.

The maximum penetration depth was measured by the following method. Welding was performed under the same conditions, and CCT specimens were separately prepared. A cross section of the welded portion was observed, and in the welded portion, the deepest melted point was taken as the maximum penetration portion, and the depth thereof was taken as the maximum penetration depth. Specifically, the outer peripheral surface of the end portion (pipe-end-thickened portion) of the pipe-end-thickened pipe and the single pipe were overlapped, and the welding was performed by bringing the electrode/arc close to the outer peripheral surface side of the end portion (pipe-end-thickened portion) of the pipe-end-thickened pipe. Therefore, the outer peripheral surface of the end portion (pipe-end-thickened portion) of the pipe-end-thickened pipe became the surface on the electrode/arc side, and the inner peripheral surface of the end portion (pipe-end-thickened portion) of pipe-end-thickened pipe became the surface (rear surface) opposite to the electrode/arc side surface. A distance (depth) from the outer peripheral surface of the end portion (pipe-end-thickened portion) of the pipe-end-thickened pipe to the maximum penetration portion is the maximum penetration depth.

These CCT specimens were evaluated by a cosmetic corrosion test method for automotive parts of JASO-M610-92. The number of cycles was set to 100 cycles, and after the test, the welded portion was cut, and two sheets of the pipe-end-thickened portion were separated so that a maximum pitting corrosion depth in the crevice portion could be evaluated. After removing rust, pitting corrosion depths in each of the test pieces which were the upper and lower parts of the crevice portion were measured at 10 points, and the deepest pitting value was taken as the maximum pitting corrosion depth of the steel type. A sample with the maximum pitting corrosion depth of less than 500 μm was evaluated as "∘" (good), and a sample with the maximum pitting corrosion depth of 500 μm or more was evaluated as "x" (poor).

Table 4 shows the penetration depths of welded portions of specimens prepared using stainless steels having respective compositions shown in Tables 1 and 2, the weld shielding gases, the maximum pitting corrosion depths (μm) obtained by the cosmetic corrosion test method for automotive parts (JASO-M610-92), and the judgment results.

TABLE 4

| | Steel type No. | Penetration depth of welded portion | Welding method | Weld shielding gas | Maximum pitting corrosion depth (μm) | Determination |
|---|---|---|---|---|---|---|
| Example of present invention | A1 | 0.5 t | TIG | Ar | 388 | ∘ |
| | A2 | 0.6 t | TIG | Ar | 301 | ∘ |
| | A3 | 0.7 t | TIG | Ar | 193 | ∘ |
| | A4 | 0.4 t | TIG | Ar | 444 | ∘ |
| | A5 | 1.2 t | MIG | Ar | 218 | ∘ |
| | A6 | 1.3 t | Laser | — | 189 | ∘ |
| | A7 | 0.3 t | MIG | Ar + 2% $O_2$ | 176 | ∘ |
| | A8 | 1.9 t | MIG | Ar | 311 | ∘ |
| | A9 | 2.0 t | MAG | Ar + 2% $CO_2$ | 305 | ∘ |
| | A10 | 1.5 t | TIG | Ar | 387 | ∘ |
| | A11 | 1.0 t | MIG | Ar | 430 | ∘ |
| | A12 | 1.1 t | laser | — | 219 | ∘ |
| | A13 | 1.8 t | TIG | Ar + 1% $O_2$ | 409 | ∘ |
| | A14 | 0.8 t | TIG | Ar | 250 | ∘ |
| Comparative Example | B1 | 0.9 t | MIG | Ar | 521 | x |
| | B2 | 1.6 t | TIG | Ar | 697 | x |
| | B3 | 0.4 t | MAG | Ar + 4% $O_2$ | 515 | x |
| | B4 | 0.5 t | MIG | Ar | 568 | x |
| | B5 | 0.8 t | TIG | Ar | 750 | x |
| | B6 | 1.0 t | TIG | Ar | 533 | x |
| | B7 | 2.0 t | MIG | Ar + 3% $O_2$ | 582 | x |
| | B8 | 1.1 t | TIG | Ar | 590 | x |
| | B9 | 1.1 t | TIG | Ar + 4% $CO_2$ | 573 | x |
| | B10 | 1.7 t | TIG | Ar | 592 | x |
| | B11 | 1.9 t | Laser | — | 766 | x |
| | B12 | 0.5 t | TIG | Ar | 536 | x |
| | B13 | 0.6 t | MAG | Ar + 3% $CO_2$ | 698 | x |
| | B14 | 0.8 t | TIG | Ar | 668 | x |
| | A1' | 0.2 t | TIG | Ar | 542 | x |

TABLE 4-continued

| Steel type No. | Penetration depth of welded portion | Welding method | Weld shielding gas | Maximum pitting corrosion depth (μm) | Determination |
|---|---|---|---|---|---|
| A2' | More than 2.0 t | TIG | Ar | 692 | x |
| A3' | More than 2.0 t | TIG | Ar | 555 | x |
| A4' | 0.4 t | TIG | Ar + 6% $O_2$ | 549 | x |
| A5' | 1.2 t | MIG | Ar + 6% $CO_2$ | 597 | x |
| A6' | 1.3 t | MAG | Ar + 7% $O_2$ | 612 | x |

When a sheet thickness of a single pipe portion of the pipe-end-thickened pipe is represented by t, it can be understood that, according to the results in Table 4, in the case where the penetration depth of the welded portion is less than 0.3 t or more than 2.0 t, the maximum pitting corrosion depth is 500 μm or more. In addition, it can be understood that in the case where the shielding gas at the time of welding contains $CO_2$ or $O_2$ in an amount of more than 5% by volume, the maximum pitting corrosion depth is 500 μm or more.

INDUSTRIAL APPLICABILITY

According to the present embodiment, it is possible to provide a ferritic stainless steel pipe having excellent corrosion resistance against salt damage in a crevice portion. In addition, by using the steel pipe to which the present embodiment is applied as parts for automobiles and motorcycles in particular, it becomes possible to reduce the thickness, it is possible to achieve efficient manufacturing of components, and it is possible to improve fuel efficiency.

That is, the present embodiment is extremely useful in industry.

EXPLANATION OF REFERENCE SIGNS

A: joint, 1: pipe-end-thickened structure, 1a: pipe-end-thickened portion, 1b: crevice portion, 2: steel pipe, 3: welded portion

The invention claimed is:

1. A ferritic stainless steel pipe having excellent corrosion resistance against salt damage in a crevice portion, comprising, by mass %:
C: 0.001% to 0.100%;
Si: 0.01% to 2.00%;
Mn: 0.01% to 2.00%;
P: 0.001% to 0.05%;
S: 0.0001% to 0.005%;
Cr: 10.5% to 20.0%;
Sn: 0.001% to 0.600%;
Ti: 0.001% to 1.000%;
Al: 0.001% to 0.100%; and
N: 0.001% to 0.02%,
with a balance being Fe and unavoidable impurities,
the ferritic stainless steel pipe comprising:
a pipe end portion, and
a pipe-end-thickened portion at the pipe end portion, wherein the pipe-end-thickened portion is a portion of the ferritic stainless steel pipe where the ferritic stainless steel pipe is folded inwardly or outwardly, thereby causing a folded portion,
wherein a gap distance d, in micrometers, between the ferritic stainless steel pipe and the folded portion of the ferritic stainless steel pipe, satisfies:

$$d \geq Cr^2/(1000Sn)$$

wherein Cr and Sn represent amounts, in mass %, of Cr and Sn, respectively, and
wherein the gap distance d is 3.5 to 65.3 μm.

2. The ferritic stainless steel pipe having excellent corrosion resistance against salt damage in a crevice portion according to claim 1, further comprising, by mass %, one or more of:
Ni: 0.1% to 1.0%;
Mo: 0.1% to 3.0%;
Cu: 0.10% to 3.00%;
B: 0.0001% to 0.0050%;
Nb: 0.001% to 0.300%;
W: 0.001% to 1.00%;
V: 0.001% to 0.50%;
Sb: 0.001% to 0.100%; and
Co: 0.001% to 0.500%.

3. The ferritic stainless steel pipe having excellent corrosion resistance against salt damage in a crevice portion according to claim 1, further comprising, by mass %, one or more of:
Ca: 0.0001% to 0.0050%;
Mg: 0.0001% to 0.0050%;
Zr: 0.0001% to 0.0300%;
Ga: 0.0001% to 0.0100%;
Ta: 0.001% to 0.050%; and
REM: 0.001% to 0.100%.

4. The ferritic stainless steel pipe having excellent corrosion resistance against salt damage in a crevice portion according to claim 1, which is used for a pipe-end-thickened structure.

5. A pipe-end-thickened structure comprising the ferritic stainless steel pipe according to claim 1.

6. A welded joint comprising a pipe-end-thickened portion including the ferritic stainless steel pipe according to claim 1.

7. The welded joint according to claim 6, further comprising:
a structure that is joined by being welded to the pipe-end-thickened portion,
wherein, when a sheet thickness of a single pipe portion of the ferritic stainless steel pipe is represented by t, a maximum penetration depth on a side of the ferritic stainless steel pipe in a welded portion is 0.3 t to 2.0 t.

8. A welded structure comprising the welded joint according to claim 7.

9. The ferritic stainless steel pipe having excellent corrosion resistance against salt damage in a crevice portion according to claim 2, further comprising, by mass %, one or more of:
Ca: 0.0001% to 0.0050%;
Mg: 0.0001% to 0.0050%;
Zr: 0.0001% to 0.0300%;
Ga: 0.0001% to 0.0100%;
Ta: 0.001% to 0.050%; and
REM: 0.001% to 0.100%.

10. The ferritic stainless steel pipe having excellent corrosion resistance against salt damage in a crevice portion according to claim 2, which is used for a pipe-end-thickened structure.

11. The ferritic stainless steel pipe having excellent corrosion resistance against salt damage in a crevice portion according to claim 3, which is used for a pipe-end-thickened structure.

12. A pipe-end-thickened structure comprising the ferritic stainless steel pipe according to claim 2.

13. A pipe-end-thickened structure comprising the ferritic stainless steel pipe according to claim 3.

14. A pipe-end-thickened structure comprising the ferritic stainless steel pipe according to claim 4.

15. A welded joint comprising a pipe-end-thickened portion including the ferritic stainless steel pipe according to claim 2.

16. A welded joint comprising a pipe-end-thickened portion including the ferritic stainless steel pipe according to claim 3.

17. A welded joint comprising a pipe-end-thickened portion including the ferritic stainless steel pipe according to claim 4.

* * * * *